(12) United States Patent
Xue et al.

(10) Patent No.: US 11,880,660 B2
(45) Date of Patent: Jan. 23, 2024

(54) INTERPRETING TEXT CLASSIFIER RESULTS WITH AFFILIATION AND EXEMPLIFICATION

(71) Applicant: Microsoft Technology Licensing, LLC, Redmond, WA (US)

(72) Inventors: Xinjian Xue, Bothell, WA (US); Adeel Jamil Siddiqui, Redmond, WA (US); Ryan Wang Gao, Seattle, WA (US); Jong-Chin Lin, Bellevue, WA (US); Bin Pan, Bellevue, WA (US); Naveen Duddi Haribabu, Redmond, WA (US); Balaji Ramasubramaniam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 17/182,088

(22) Filed: Feb. 22, 2021

(65) Prior Publication Data

US 2022/0269864 A1  Aug. 25, 2022

(51) Int. Cl.
  *G06F 40/30* (2020.01)
  *G06F 16/35* (2019.01)
  *G06F 40/279* (2020.01)
  *G06N 3/044* (2023.01)

(52) U.S. Cl.
  CPC .......... *G06F 40/30* (2020.01); *G06F 40/279* (2020.01); *G06N 3/044* (2023.01)

(58) Field of Classification Search
  CPC .. G06F 16/35; G06F 18/24137; G06F 40/279; G06F 40/30; G06N 20/00
  USPC .............. 704/1, 9; 706/12, 20; 707/737, 748
  See application file for complete search history.

(56) References Cited

U.S. PATENT DOCUMENTS

| | | | |
|---|---|---|---|
| 6,397,215 B1* | 5/2002 | Kreulen | G06F 40/242 707/752 |
| 7,539,619 B1* | 5/2009 | Seligman | G10L 15/30 704/2 |
| 10,242,260 B1* | 3/2019 | Shen | G06F 40/30 |
| 2011/0047161 A1* | 2/2011 | Myaeng | G06F 16/3338 707/740 |

(Continued)

OTHER PUBLICATIONS

Arras, et al., ""What is relevant in a text document?": An interpretable machine learning approach", In Journal of PloS One, vol. 12, Issue 8, Aug. 11, 2017, 23 Pages.

(Continued)

*Primary Examiner* — Martin Lerner
(74) *Attorney, Agent, or Firm* — Calfee, Halter & Griswold LLP (57) ABSTRACT

Technologies relating to model interpretation are described herein. A text classifier is provided with input text and assigns a class to the input text from amongst several possible classes. Based upon the class assigned to the input text by the text classifier, a class profile of a centroidal classifier is selected, where the class profile is constructed based upon numerous input texts to which the text classifier has previously assigned the class. Based upon the selection of the class profile, information that is indicative of operation of the text classifier with respect to the text classifier assigning the class to the input text is output, where the information includes an exemplar text sequence.

13 Claims, 5 Drawing Sheets

(56) References Cited

U.S. PATENT DOCUMENTS

| | | | | |
|---|---|---|---|---|
| 2015/0113388 A1* | 4/2015 | Barrett | ................... | G06F 40/30 |
| | | | | 715/249 |
| 2017/0235820 A1* | 8/2017 | Conrad | ................ | G06F 40/295 |
| | | | | 707/728 |
| 2017/0337266 A1* | 11/2017 | Bhatt | ...................... | G06F 16/35 |
| 2019/0163817 A1* | 5/2019 | Milenova | ............... | G06N 20/00 |
| 2020/0327284 A1* | 10/2020 | Sapugay | ................ | G06F 40/30 |
| 2021/0201143 A1* | 7/2021 | Choi | ....................... | G06F 40/30 |
| 2021/0216762 A1* | 7/2021 | Brooks | ................... | G06F 40/30 |

OTHER PUBLICATIONS

"International Search Report & Written Opinion issued in PCT Application No. PCT/US22/013575", dated Mar. 23, 2022, 10 Pages.

"Termcolor2 0.0.3", Retrieved from: https://pypi.org/project/termcolor2/, Retrieved Date: Jan. 13, 2021, 3 Pages.

Guan, et al., "A Class-Feature-Centroid Classifier for Text Categorization", In Proceedings of the 18th International Conference on World Wide Web, Apr. 20, 2009, pp. 201-210.

Minaee, et al., "Deep Learning Based Text Classification: A Comprehensive Review", In Journal of Computing Research Repository, Apr. 6, 2020, 42 Pages.

Wallace, et al., "AllenNLP Interpret: A Framework for Explaining Predictions of NLP Models", In Journal of Computing Research Repository, Sep. 19, 2019, 6 Pages.

* cited by examiner

INTERPRETING TEXT CLASSIFIER RESULTS WITH AFFILIATION AND EXEMPLIFICATION

BACKGROUND

Computer implemented text classifiers have been developed to assign a classification to text provided to the classifiers. For instance, a conventional computer-implemented text classifier is configured to assign a topic (from among several predefined topics) to input text, where the input text may be a phrase, a sentence, a paragraph, etc. In another example, a conventional computer-implemented text classifier is configured to assign a sentiment (from amongst predefined sentiments) to input text. Accuracy of conventional computer-implemented text classifiers with respect to assigning classifications to tasks has increased over time, where the increase in accuracy is at least partially due to advances made in underlying architectures of these classifiers.

From the perspective of an end user, however, as accuracy of text classifiers has improved, it has become increasingly difficult to understand behavior of such classifiers. For instance, a computer-implemented text classifier may include a deep neural network (DNN) that is employed in connection with assigning a classification to input text; however, operation of the DNN is entirely hidden from the end user. Therefore, the end user may perceive the computer-implemented text classifier as a magic black box, and thus lack trust in the output of the classifier.

To address this issue, a conventional computer-implemented text classifier has been developed (or modified) to include code that causes explanatory output to be generated, where the explanatory output describes operations performed by the computer-implemented text classifier when assigning a class to input text. Such approach, however, is incredibly costly, as an existing classifier must be rewritten to include the code or as a newly developed classifier must be developed to include the code that is unique to that classifier. Hence, including such code in a classifier lacks robustness, as the code is developed only for a particular text classifier and is applicable only for the particular text classifier.

SUMMARY

The following is a brief summary of subject matter that is described in greater detail herein. This summary is not intended to be limiting as to the scope of the claims.

Described herein are various technologies pertaining to performing model interpretation with respect to a computer-implemented text classifier, where model interpretation is enabled through use of a separate centroidal classifier. With more specificity, a computer-implemented text classifier is trained to assign respective classifications to input texts. The text classifier may have any suitable type of architecture, including but not limited to a rules-based architecture, a neural network-based architecture (a deep neural network (DNN), a recurrent neural network (RNN), etc.). Moreover, the text classifier can perform any suitable type of text classification, including topic classification, semantic classification, and so forth.

Subsequent to the text classifier being trained, a centroidal classifier is learned based upon input texts provided to the text classifier and respective classifications assigned to the input texts by the text classifier. Therefore, the centroidal classifier, once learned, is configured to substantially mimic operation of the text classifier. More particularly, for each class that is assignable to input text by the text classifier, the centroidal classifier has a corresponding class profile, where a class profile for a class is constructed based upon input texts provided to the text classifier, where the text classifier assigned the class to such input texts. In still more detail, embedding technologies are employed to represent input text as a vector of integers; thus, each of the input texts to which the class has been assigned by the text classifier is represented as a respective vector of integers. The class profile for the class is based upon a mean of vectors of integers that represent the input texts. Therefore, when the centroidal classifier receives a new vector of integers, the centroidal classifier can identify a class profile that is closest in distance to the new vector of integers, and the new vector of integers (and therefore text represented by the new vector of integers) is assigned to a class that corresponds to the class profile. Again, the class profiles statistically represent operation of the text classifier when assigning classes to input texts.

These class profiles of the centroidal classifier are employed to provide insight into operation of the text classifier when the text classifier assigns a class to input text. With more specificity, the text classifier receives the input text and assigns a class to the input text from amongst several possible classes. A class profile that corresponds to the class assigned to the text is then selected, and output that is indicative of operation of the text classifier with respect to assigning the input text to the class is generated. For example, such output can include other text that was previously assigned to the class by the computer-implemented classifier, wherein the other text is computed as being similar to the input text; hence a user of the text classifier is provided with insight as to operation of the text classifier, since the user is provided with the other (similar) text that was also assigned to the class by the text classifier.

Further, as the class profile is a statistical representation of operation of the text classifier with respect to the class, a term or terms in the input text that are correlated with the class can be identified (e.g., based upon input texts from which the class profile was constructed). That is, a list of terms that are highly correlated to the class can be identified based upon the vectors used to construct the class profile. For instance, using a term frequency-inverse document frequency (TF-IDF) measurement, values for terms (for the class profile) can be computed and a list of most "important" terms for the class profile (and thus the class) can be identified. The input text is then searched for these important terms, and when the input text includes a term that is in the list of important terms, the term is highlighted to the user of the text classifier. The highlighted term can indicate to the user of the text classifier that the text classifier assigned the input text to the class at least partially due to the input text including the term.

The technologies described herein exhibits various advantages over conventional technologies used for model interpretation. For example, the technologies described herein can be employed regardless of the architecture of the text classifier being interpreted, as the class profiles are constructed based upon input texts provided to the text classifier and classes assigned to the input texts. Moreover, contrary to conventional technologies, the text classifier need not be developed or modified to include code that describes operation of the text classifier when outputting class assignments.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to providing an interpretation of operation of a computer-implemented text classifier with respect to a class assignment made by the text classifier are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Described herein are various technologies pertaining to outputting information to a user of a computer-implemented text classifier that is indicative of operation of the text classifier with respect to a classification made by the text classifier. As will be described in greater detail herein, this can be accomplished by learning a statistical classifier (a centroidal classifier) that mimics operation of the text classifier. Information corresponding to the statistical classifier may then be presented to a user of the text classifier to provide the user with information that is indicative of operation of the text classifier with respect to the text classifier generating a classification for input text. Advantages of such technologies include robustness, in that the technologies described herein can be employed with computer-implemented text classifiers that have any suitable architecture. Moreover, code need not be added to existing computer-implemented text classifiers in connection with providing information indicative of operation of such text classifiers to users of the text classifiers.

Figure 1:
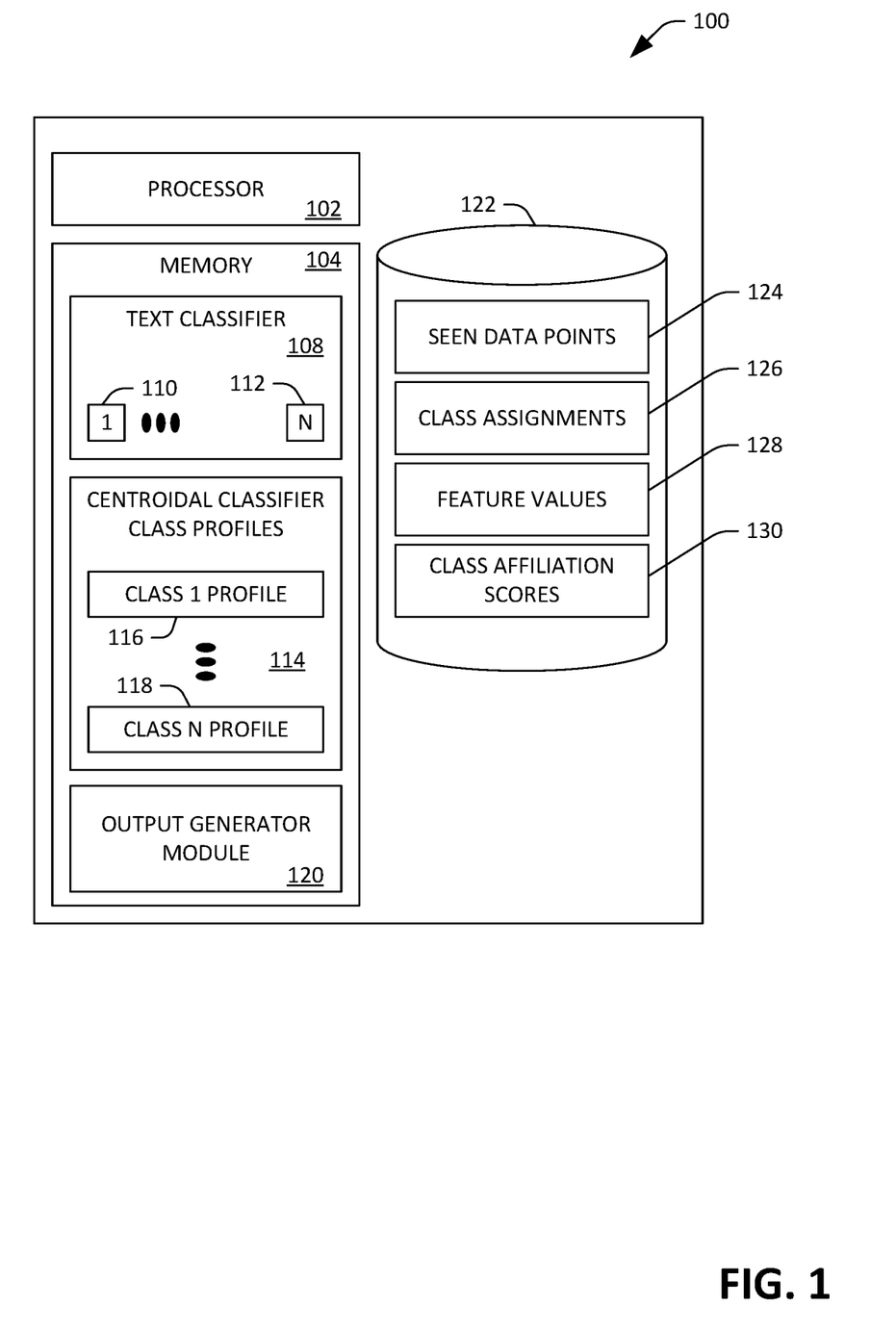
FIG. 1 is a functional block diagram of a computing system that is configured to present a user of a computer-implemented text classifier with output that is indicative of operation of the computer-implemented text classifier with respect to assignment of a class to text provided to the text classifier.

With reference now to FIG. 1, a functional block diagram of a computing system 100 that is configured to output information that is indicative of operation of a computer-implemented text classifier with respect to a classification performed by the text classifier is illustrated. The computing system 100 includes a processor 102 and memory 104, where the memory 104 includes data that is accessed by the processor 102 and instructions that are executed by the processor 102.

The memory 104 includes a computer-implemented text classifier 108 that is configured assign a class to input text from amongst two or more possible classes. The text classifier 108 can be configured to perform any suitable text classification task, including but not limited to sentiment classification, news categorization, topic classification, question answering, natural language inference, amongst others. Sentiment classification refers to the task of analyzing content of textual data (e.g., product reviews, movie reviews, social media messages etc.) and identifying polarity and viewpoint of such textual data. When configured to perform sentiment classification, the text classifier 108 may be a binary classifier or a multiclass classifier. When the text classifier 108 is a binary classifier, the text classifier 108 is configured to classify input texts into positive and negative classes; when the text classifier 108 is configured to perform sentiment classification and is a multi class classifier, the text classifier 108 classifies input texts into fine-grained labels or multilevel intensities (e.g., somewhat upset, very upset, etc.).

When the text classifier 108 is configured to perform news categorization, the text classifier 108 is configured to identify emerging news topics and/or recommend relevant news based upon known or inferred user interests. When the text classifier 108 is configured to perform topic classification, the text classifier 108 is configured to identify themes or topics of input texts (e.g., whether an input product review pertains to "customer support", "ease-of-use", etc.).

When the text classifier 108 is configured to perform question answering tasks, the text classifier 108 can be configured to perform either extractive or generative tasks. Extractive question answering tasks pertain to when the text classifier 108 assigns an input question to an existing class (e.g., the text classifier 108 classifies a candidate answer as correct or not correct). Generative question answering tasks pertain to when the text classifier 108 is configured to generate answers on-the-fly.

When the text classifier 108 is configured to perform natural language inference, the text classifier 108 is configured to predict whether the meaning of one input text can be inferred from another. For instance, the text classifier 108 can be configured to assign to a pair of text units a label such as entailment, contradiction, and neutral. Paraphrasing is a generalized form of natural language inference, such that the text classifier 108 is configured to measure semantic similarity of a sentence pair, thereby indicating how likely one sentence is a paraphrase of the other. From the foregoing, it is to be understood that the text classifier 108 can be configured to perform any suitable text classification task. To that end, the text classifier 108 is configured to assign one of N classes 110-112 to input text; when the text classifier 108 is a binary classifier, N=2, while when the text classifier 108 is a multi class classifier, N>2.

Further, the text classifier 108 can have any suitable structure. For instance, the text classifier 108 may be or include a feed forward neural network, a recurrent neural network (RNN), (including a long short-term memory (LSTM-RNN)), a convolutional neural network (CNN), a capsule neural network, a model that includes an attention mechanism, a memory augmented network, a graph neural network (including a graph convolutional network), a hybrid model that, for instance, is a combination of LSTM and CNN architectures, a transformer based pre-trained language model, etc.

The memory 104 further includes centroidal classifier class profiles 114, where the class profiles 114, when included in a centroidal classifier, can be employed to mimic performance of the text classifier 108. The class profiles 114 include a plurality of class profiles 116-118 that respectively correspond to the classes 110-112 of the text classifier 108.

The computing system 100 further includes an output generator module 120 that, based upon a class assigned to input text by the text classifier 108, is configured to generate output that is indicative of operation of the text classifier 108 with respect to the text classifier 108 assigning the class to the input text. As will be described in greater detail below, the output generator module 120 is configured to generate the output further based upon a class profile from amongst the class profiles 116-118 and input texts employed to construct the class profile.

The computing system 100 also includes a data store 122 that comprises the following information: 1) seen data points 124; 2) class assignments 126 for the seen data points 124; 3) feature values 128 exposed by the text classifier 108, where the feature values 128 are indicative of per-class weights for terms included in input texts previously provided to the text classifier 108; and 4) class affiliation scores 130 for the classes 110-112, where a class affiliation score for a class is indicative of consistency in assignment of input texts to the class between the text classifier 108 and a centroidal classifier that includes the class profiles 116-118. Put differently, a high affiliation score for a class indicates that the centroidal classifier closely mimics operation of the text classifier 108 when assigning the class to input texts.

The seen data points 124 include vectors of integers that represent input texts previously provided to the text classifier 108, and the class assignments 126 are respective classes assigned to the input texts by the text classifier 108. Therefore, the seen data points 124 include several vectors of integers that represent input texts to which the text classifier 108 assigned the first class 110, and the seen data points 124 also include several vectors of integers that represent input texts to which the text classifier 108 assigned the Nth class 112. The feature values 128, as indicated previously, are class-specific weights for terms, and may be exposed by the text classifier 108 and/or may be learned based upon the seen data points 124 and class assignments 126. For instance, a weight assigned to a term for the first class 110 can indicate the "importance" of the term to the text classifier 108 assigning the first class 110 to input text that includes the term.

The class profiles 116-118 are constructed based upon the seen data points 124, the class assignments 126, and optionally the feature values 128. Thus, the first class profile 116 is constructed based upon a first set of data points in the seen data points 124 to which the text classifier 108 has assigned the first class 110, and the Nth class profile 118 is constructed based upon an Nth set of data points in the seen data points 124 to which the text classifier 108 has assigned the Nth class 112. Further, in an example, the first class profile 116 is constructed based upon weights in the feature values 128 for the first class 110, where the weights are assigned to terms and indicate "importance" of such terms when the text classifier 108 assigns the first class 110 to input texts. Once the class profiles 116-118 have been constructed, the class affiliation scores 130 for the classes 110-112 can be computed. As indicated previously, a first class affiliation score in the class affiliation scores 130 can indicate a likelihood that, for input text not previously seen by either the text classifier 108 or a centroidal classifier that includes the class profiles 116-118, the centroidal classifier will assign the same classification to the input text as was assigned by the text classifier 108.

Figure 2:
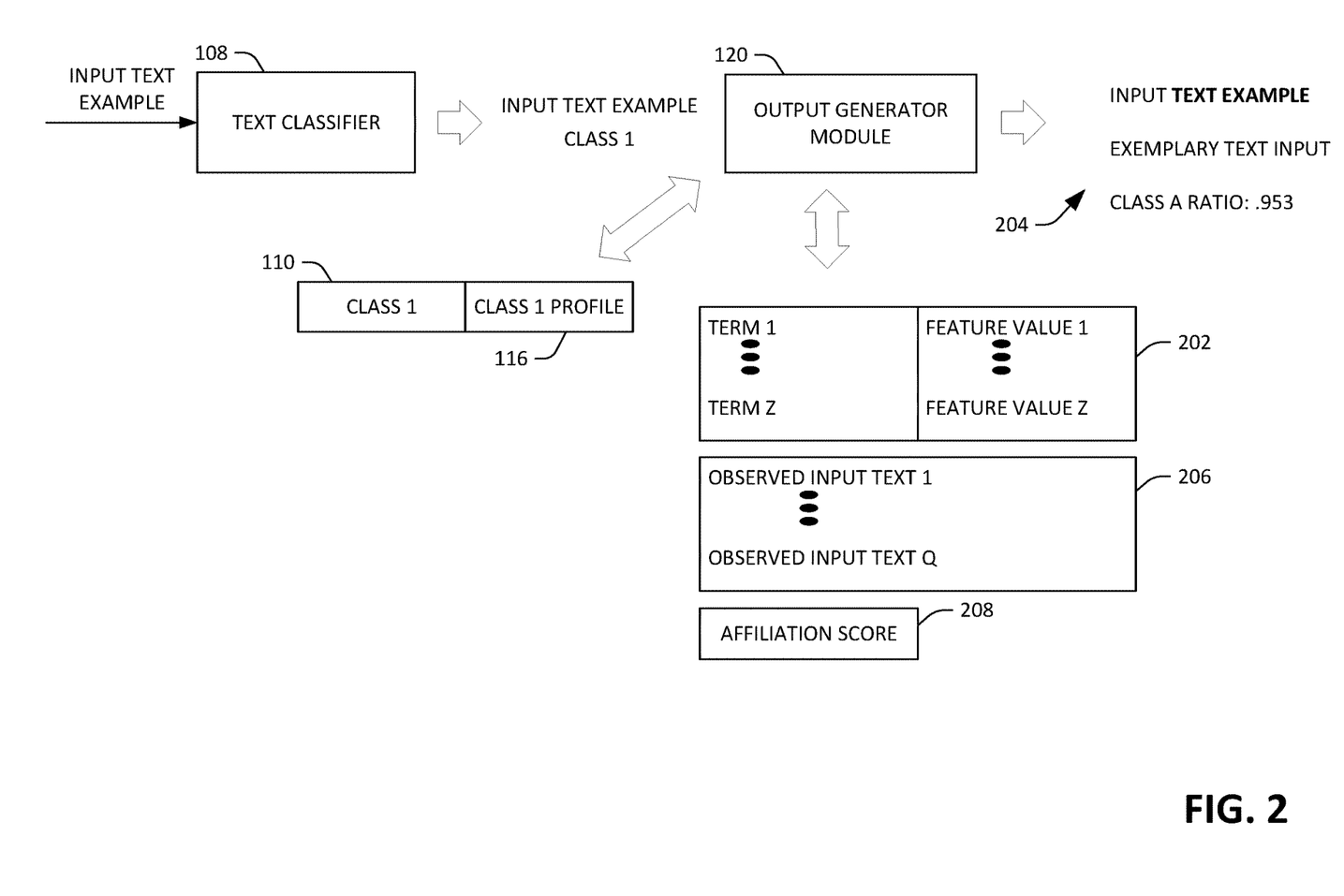
FIG. 2 is a schematic that illustrates operation of the computing system depicted in FIG. 1.

An example of operation of the output generator module 120 is now set forth with respect to FIGS. 1 and 2, where FIG. 2 is a schematic that depicts such operation. As illustrated in FIG. 2, the text classifier 108 receives the input text "INPUT TEXT EXAMPLE" and assigns the first class 110 to the input text. The output generator module 120 receives the input text and an identity of the first class 110 and selects the first class profile 116 based upon the first class 110 being assigned to the input text by the text classifier 108. In addition, the output generator module 120 receives the input text.

As the output generator module 120 has received the identity of the first class 110, the output generator module 120 can search content of the data store 122 for information that is indicative of operation of the text classifier 108 with respect to the assignment of the first class 110 to the input text. In a first example, the output generator module 120 accesses the feature values 128 and identifies terms that are of high "importance" for the first class 110. As indicated previously, the feature values 128 may be weights assigned to terms in the seen data points 124 that have been assigned to the first class 110 by the text classifier 108, where the weights are indicative of statistical significance of such terms when the text classifier 108 assigns input texts that include the terms to the first class 110. Thus, the output generator module 120 identifies a set 202 of terms and corresponding weights from the feature values 128, where the set 202 is assigned to the first class 110. The output generator module 120 can identify terms that have a threshold weight assigned thereto from the feature values 128. In another example, the output generator module 120 identifies a threshold number of terms from the feature values 128 that have highest weights assigned thereto. The output generator module 120 can then search the input text for the identified terms. When the output generator module 120 determines that a term in the input text is included in the identified terms, the output generator module 120 displays the input text and highlights the term in the input text. As illustrated in FIG. 2, and according to this example, the output generator module 120 generates an output 204 that includes the input text "INPUT TEXT EXAMPLE" with the terms "TEXT" and "EXAMPLE" highlighted therein, due to such terms being included in the set 202 and being identified in the input text by the output generator module 120. This information can indicate to the user of the text classifier 108 that the text classifier 108 assigned the first class 110 to the input text at least partially due to the input text including the terms "TEXT" and "EXAMPLE".

In another example, the output generator module 120 can identify an exemplar that corresponds to the first class 110 and include the exemplar in the output 204. With more specificity, based upon the identity of the first class received by the output generator module 120, the output generator module 120 searches the seen data points 124 to identify a set 206 of seen data points that have been assigned the first class 110 by the text classifier 108. As indicated previously, these seen data points are vectors of values that represent input texts previously classified by the text classifier 108. If the input text has not been transformed into a vector of values, the output generator module 120 transforms the input text into a vector of values utilizing suitable embedding technologies; for instance, the output generator module 120 can transform each term in the input text into integer values, such that the vector of values includes such integer values. The output generator module 120 can then compute distances between the vector of values that represent the input text and the seen data points in the set 206, and can identify a seen data point from the set 206 that is closest in distance to the vector of values. The output generator module 120 subsequently generates text (represented by the seen data point) based upon the seen data point and/or retrieves the text based upon the seen data point. The output generator module 120 then includes the text in the output 204 as an exemplar. In the example shown in FIG. 2, the output 204 includes the text "EXEMPLARY TEXT INPUT". Such exemplar may be informative to the user as to why the text classifier 108 assigned the first class 110 to the input text (e.g., since the text classifier 108 assigned the first class 110 to the exemplar, it makes sense that the text classifier 108 also assigned the first class 110 to the input text).

In yet another example, the output generator module 120, based upon the received identity of the first class 110, can retrieve an affiliation score 208 for the first class from the class affiliation scores 130 and include the retrieved affiliation score 208 in the output 204. Again, the affiliation score 208 can be indicative of consistency between the text classifier 108 and a centroidal classifier that includes the class profiles 116-118 with respect to assigning input texts to the first class 110. Put differently, the higher the affiliation score 208, the more confidence that the user of the text classifier 108 can have in the information included in the output 204.

A mathematical description of features referenced above is now set forth. The text classifier 108 $\mathscr{E}$ is trained with a training dataset X that includes numerous data points (rows), with each data point having several columns. Each row $x \in X$ represents input text, where each row has many variables (columns) $x=[x_1 \cdots x_n]$. The variables are alphanumeric terms, and may include words, abbreviations, and numbers. Natural language processing (NLP) word (term)-to-vector conversion can be performed with respect to each variable, and statistically significant terms are therefore represented by numbers. Thus, a variable is transformed into a vector $x_i=[x_{i1} \cdots x_{im_i}]$. Further, each data point in the training data is labeled as belonging to a class $c \in C$. The text classifier 108 is then trained upon such training data so that the trained text classifier 108 can optimally predict which class to assign to unseen input text upon receipt of the unseen input text.

As described previously, the centroidal class profiles 114 are constructed such that the centroidal classifier that includes the class profiles 114 mimics operation of the text classifier 108 as closely as possible, such that the goal is to identify a mapping that maps an unseen data point to a class that is the same as the one predicted by the text classifier 108. While total affiliation is unrealistic, high affiliation is desired for each of the classes 110-112. Given an unseen data set that includes $\eta_c$ (a subset of data points of class c predicted by the classifier $\mathscr{E}$), where $\lambda_c$ is the subset of data points of class c mapped by the mapping, the affiliation ratio of the mapping with respect to the text classifier $\mathscr{E}$ for class c is as follows:

$$\alpha_c = \frac{|\lambda_c \cap \eta_c|}{|\eta_c|}, c \in C \tag{1}$$

Therefore, $0 \leq \alpha_c \leq 1$. If $\alpha_c=1$ for all $c \in C$, the perfect mapping is obtained.

As noted above, the goal is to construct the class profiles 116-118 such that when unseen text is provided to the centroidal classifier that include such profiles 116-118, the class profile from amongst the class profiles 116-118 is identified that corresponds to the class predicted for the unseen data point by the text classifier 108.

Additional description of the class profiles 116-118 is now set forth. Denoting a as the set of seen data points in class $c \in C$, and $|\alpha|=n_c$, the class profile for class c can be defined as follows:

$$P_c^a = [p_{11}^a \cdots p_{nm}^a] \tag{2}$$

The class average may then be computed as follows:

$$p_{ij}^a = \frac{1}{n_c} \sum_{k=1}^{n_c} x_{ijk}, i = [1, n], j = [1, m_j]. \tag{3}$$

To reduce impact of sparsity on the data set, the profile can be refined with the average of the nonzero elements, i.e., denoting $n_{cij}^{a'}$ as the count where $x_{ijk}>0$, then $P_c^{a'} = [p_{11}^{a'} \cdots p_{nm}^{a'}]$ is obtained, and thus:

$$p_{ij}^{a'} = \frac{1}{n_{cij}^{a'}} \sum_{k=1}^{n_{cij}^{a'}} x_{ijk}, i = [1, n], j = [1, m_j]. \tag{4}$$

Eq. (3) is the foundation of centroidal text classification. Eq. (4) varies from Eq. (3) by removing the negative impact of data sparsity, which is common in text classification applications. Experimentally it is been observed that use of Eq. (4) with centroidal text classification can provide a 1-2% improvement in affiliation ratio compared to use of Eq. (3) with centroidal text classification.

Further, as described above, the text classifier 108 can expose term importance scores (weights) after the text classifier 108 is trained based upon the training dataset. Such information can be used in a non-invasive way to inspect the text classifier 108. Since in many situations the internal mechanism of a text classifier is black-boxed, the importance scores provide the only insight into that specific classifier as to which features (terms) are the most important and least important when the text classifier 108 makes a prediction (assigns a class to input text). The feature importance scores for the text classifier 108 can be obtained from model fitting, and are represented as a vector $W=[w_{11} \cdots w_{nm}]$.

With respect to the centroidal classifier discussed above, under the pure linearity assumption and without any misfit in modeling, an unseen data point can be mapped to a class profile, and therefore mapped to a class, by the following mapping:

$$M1: x \to c, \text{ and } c = \underset{c \in C}{\mathrm{argmax}} \frac{x \cdot p_c^{a'}}{\|x\| \|p_c^{a'}\|} \tag{5}$$

Here, $$\frac{a \cdot b}{\|a\| \|b\|} = \cos\theta,$$

and is known as the cosine similarity of vectors a and b. The model feature importance scores can be introduced into the mapping as follows:

$$M2: x \to c, \text{ and } c = \underset{c \in C}{\arg\max} \frac{(W * x) \cdot (W * p_c^{a'})}{\|W * x\| \|W * p_c^{a'}\|} \quad (6)$$

Not considering the difference between $p_c^a$ and $p_c^{a'}$, Eq. (5) is the initial classification by a conventional centroidal classifier. This is improved upon in two ways: 1) the impact of data sparsity is removed as described above; and 2) the model feature importance scores are introduced to allow for behavior of the text classifier 108 to be better mimicked. Experiments have shown that Eq. (6) provides a better affiliation score than Eq. (5) by a few percentage points.

As discussed previously, the output generator module 120 can provide an exemplar to the user of the text classifier 108 based upon the input text. With more specificity, when the text classifier 108 makes a prediction for an unseen data point x to class c, to exemplify the decision of the text classifier 108, the output generator module 120 seeks a seen data point x'* that has been labeled to class c and satisfies the following:

$$\underset{x' \in X_c}{\arg\max} \frac{(W * x) \cdot (W * x')}{\|W * x\| \|W * x'\|} \quad (7)$$

Hence, as noted above, the output generator module 120 identifies a seen data point (input text) from amongst several seen data points that is closest to the unseen data point.

The technologies described herein exhibit various advantages over conventional technologies for model interpretation for text classifiers. The technologies described herein does not require training another text classifier to interpret operation of the text classifier 108; rather, the technologies described herein rely upon the class profiles 116-118 and model feature importance scores; the class profiles 116-118 can be constructed based upon training data and/or validation data for the text classifier 108, and the model feature importance scores are typically associated with the text classifier 108 subsequent to training. This simplifies computation and also makes the features described herein applicable to multiple different types of classifier. Further, visualizing high-dimensional text data is a challenging task; however, by using a class profile, hundreds of dimensions can be plotted at once and distribution of variables (terms) can be plotted using conventional technologies.

Figure 3:
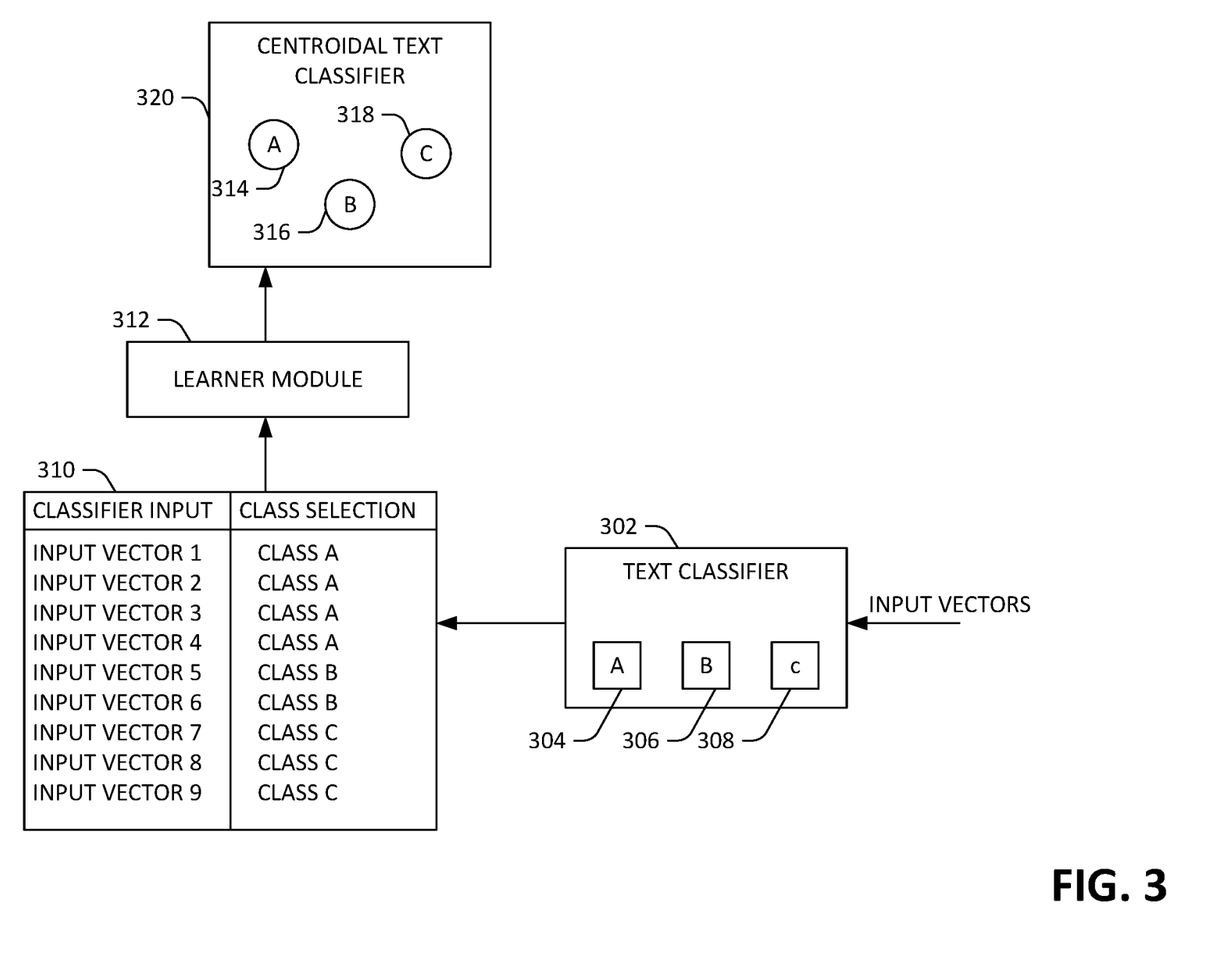
FIG. 3 is a functional block diagram of a system that is configured to construct class profiles that respectively correspond to classes that a text classifier can assign to input texts.

Referring now to FIG. 3, a schematic that illustrates constructing and updating class profiles of a centroidal text classifier is illustrated. In the example shown in FIG. 3, a text classifier 302 (which can be the text classifier 108) is configured to assign one of three classes 304-308 to input vectors (numerical representations of input text). In the example shown in FIG. 3, the text classifier 302 is provided with 9 different input vectors, and has assigned class A 304 to input vectors 1-4, has assigned class B 306 to input vectors 5-6, and has assigned class C to input vectors 7-9, as illustrated in table 310. A learner module 312 obtains the table 310, and constructs a class A profile 314 for class A 304 based upon input vectors 1-4, constructs a class B profile 316 for class B 306 based upon input vectors 5-6, and constructs a class C profile 318 for class C 308 based upon input vectors 7-9. These class profiles 314-318 can be included in a centroidal text classifier 320, where the centroidal text classifier 320 can assign a class to an input vector based upon proximities of the input vector to the class profiles 314-318. For instance, if the input vector is closer to the class A profile 314 than the class B profile 316 or the class C profile 318, the centroidal text classifier 320 assigns class A to the input vector. The learner module 312 can continue to update the class profiles 314-318 as the text classifier 302 assigns classifications to input texts.

Figure 4:
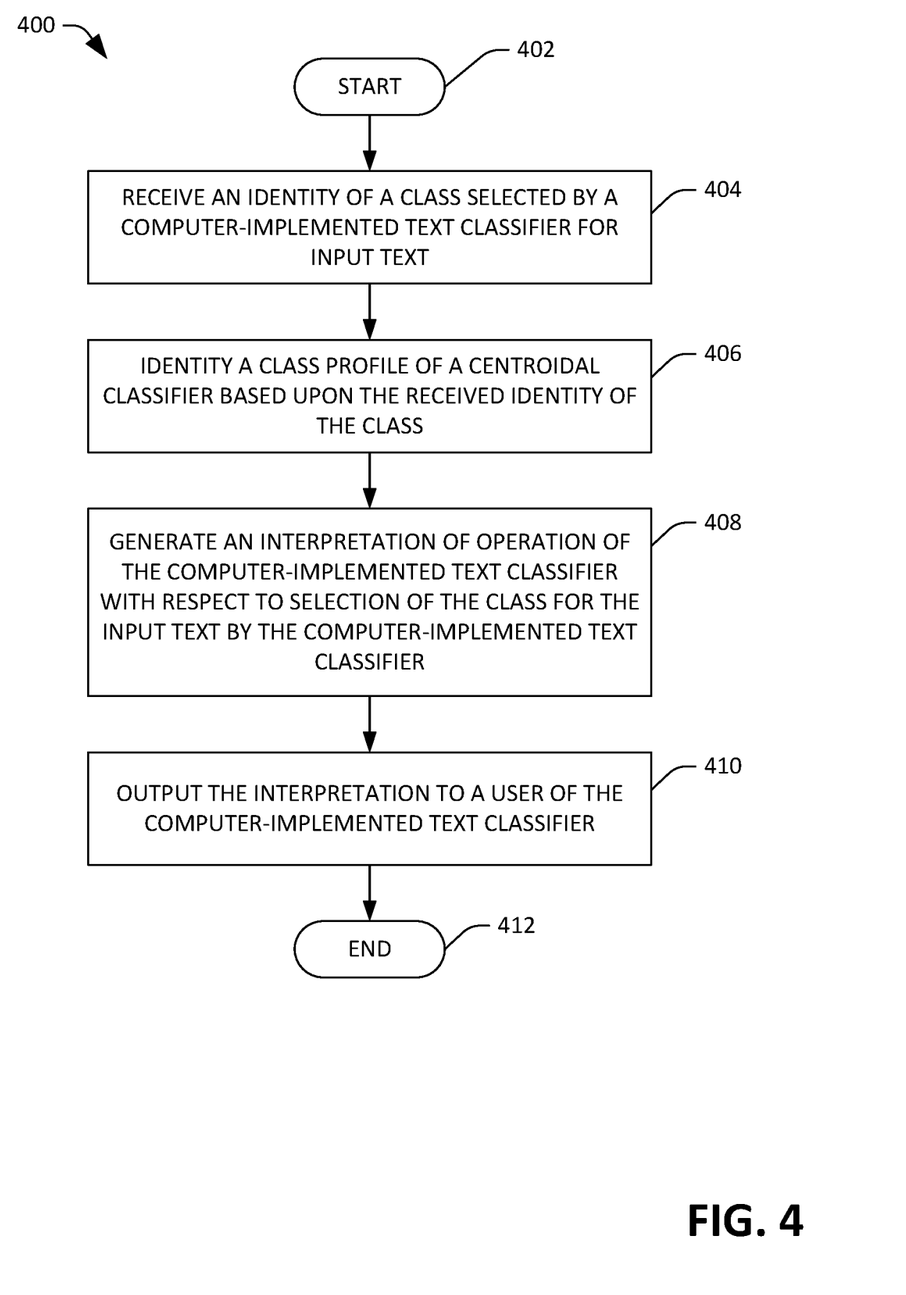
FIG. 4 is a flow diagram illustrating an exemplary methodology for generating and outputting an interpretation of operation of a computer-implemented text classifier with respect to a classification performed by such classifier.

FIG. 4 illustrates an exemplary methodology 400 relating to providing information to a user of a text classifier with respect to a classification made by the text classifier. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 400 starts at 402, and at 404 an identity of a class selected by a computer-implemented text classifier for input text is received, where the class is selected by the computer-implemented text classifier from amongst several classes (e.g., the classes 110-112).

At 406, a class profile of a centroidal classifier is identified, where the class profile is identified based upon the received identity of the class, and further where the class profile is identified from amongst several class profiles of the centroidal classifier. The class profile is generated based upon input texts for which the computer-implemented text classifier previously selected the class from amongst the several possible classes.

At 408, an interpretation of operation of the computer-implemented text classifier is generated with respect to selection of the class for the input text by the computer-implemented text classifier. The interpretation is generated based upon the class profile identified at 406. For instance, the interpretation is generated based upon information mapped to the class profile, such as an affiliation score assigned to the class profile, one or more of the input texts previously received by the text classifier, term importance scores of the text classifier, etc. At 410, the interpretation is output to a user of the computer-implemented text classifier, and the methodology 400 completes at 412.

Figure 5:
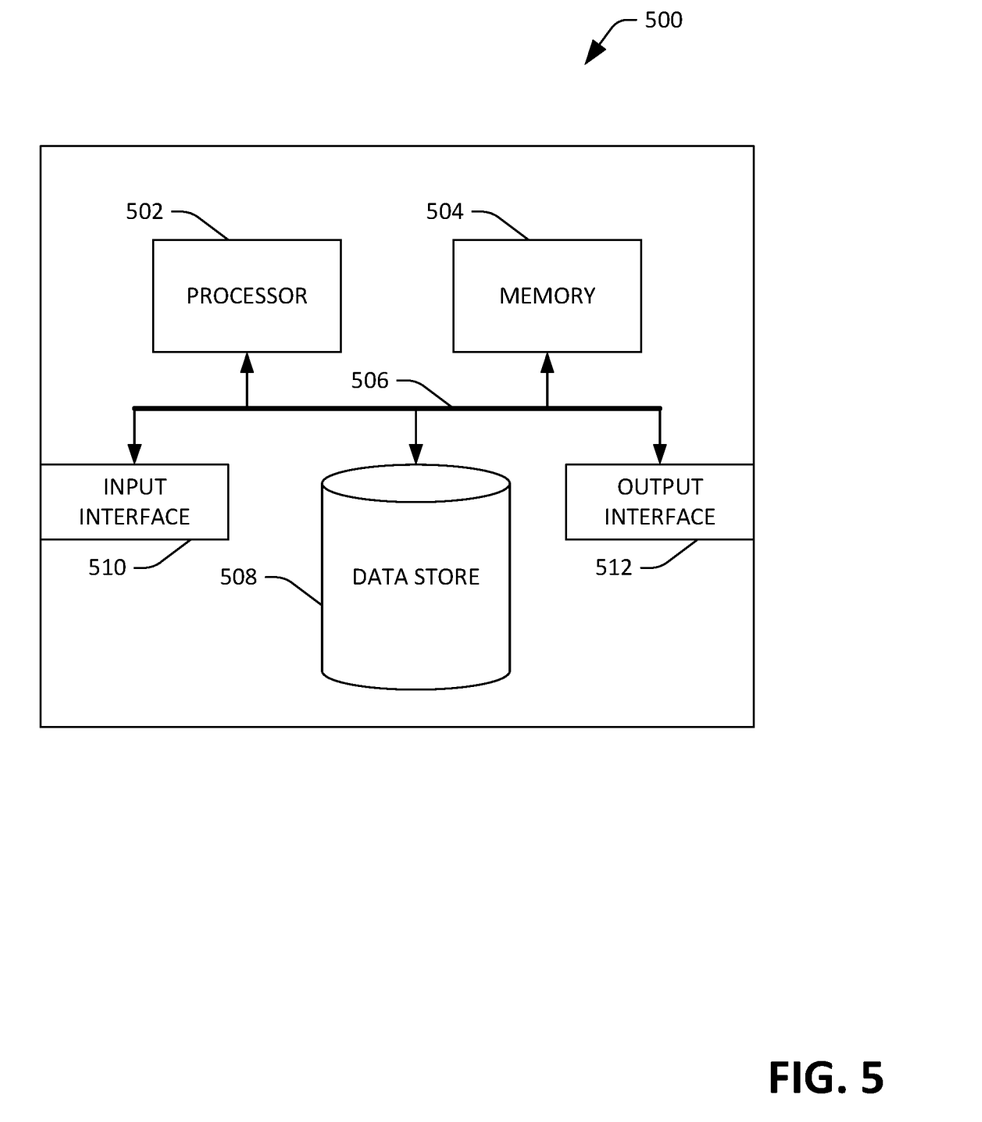
FIG. 5 is an exemplary computing system.

Referring now to FIG. 5, a high-level illustration of an exemplary computing device 500 that can be used in accordance with the systems and methodologies disclosed herein is illustrated. For instance, the computing device 500 may be used in a system that supports providing an interpretation of operation by a text classifier with respect to the text classifier assigning a class to input text. By way of another example, the computing device 500 can be used in a system that is configured to learn class profiles for a centroidal classifier. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store class profile information, input texts, etc.

The computing device 500 additionally includes a data store 508 that is accessible by the processor 502 by way of the system bus 506. The data store 508 may include executable instructions, observed input vectors (that represent text), term importance scores, affiliation scores, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

It is contemplated that the external devices that communicate with the computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 500 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein relate to performing model interpretation with respect to a computer-implemented text classifier, according to at least the examples provided below.

(A1) In one aspect, some embodiments include a method performed by at least one processor of a computing device. The method includes receiving an identity of a class selected by a computer-implemented text classifier for input text, where the class is selected by the computer-implemented text classifier from amongst several classes. The method further includes identifying a class profile of a centroidal classifier based upon the identity of the class, where the class profile is identified from amongst several class profiles of the centroidal classifier, and further where the class profile is generated based upon input texts for which the computer-implemented text classifier previously selected the class from amongst the several classes. The method additionally includes based upon the identified class profile, generating, for a user of the computer-implemented text classifier, an interpretation of operation of the computer-implemented text classifier with respect to selection of the class for the input text by the computer-implemented text classifier. The method also includes outputting the interpretation to the user of the computer-implemented text classifier.

(A2) In some embodiments of the method of A1, generating the interpretation includes identifying second input text from the several input texts, wherein the interpretation comprises the identified second input text.

(A3) In some embodiments of the method of A2, identifying the second input text from the several input texts includes computing a score that is indicative of similarity between the input text and the second input text, wherein the second input text is identified based upon the computed score.

(A4) in some embodiments of any of the methods of A1-A3, a set of feature values is assigned to the class, where the feature values are values assigned to terms in the several input texts, and further where the interpretation is generated based upon the feature values.

(A5) In some embodiments of the method of A4, generating the interpretation includes identifying at least a portion of a term in the input text based upon a feature value assigned to the term, wherein the interpretation includes the input text with the at least the portion of the term highlighted therein.

(A6) In some embodiments of the method of A5, the interpretation further includes the feature value assigned to the term.

(A7) In some embodiments of any of the methods of A1-A6, an affiliation score is assigned to the class profile, where the affiliation score is indicative of an amount of consistency between the computer-implemented text classifier and the centroidal classifier when selecting the class for input texts provided to both the computer-implemented text classifier and the centroidal classifier, and further where the interpretation includes the affiliation score.

(B1) In another aspect, some embodiments include a method performed by a computing system (e.g., 100) that includes a processor (e.g., 102) and memory (e.g., 104). The method includes obtaining an identity of a class assigned to an input vector by a computer-implemented text classifier (e.g., 108), where the input vector is representative of a sequence of terms, and further where the class is amongst several classes to which input vectors are assignable by the computer-implemented text classifier (e.g., 108). The method further includes based upon the identity of the class, selecting a class profile (e.g., 116-118) of a centroidal classifier, the class profile (e.g., 116-118) constructed based upon a set of vectors previously identified as belonging to the class by the computer-implemented text classifier (e.g., 108). The method also includes generating output based upon the selected class profile (e.g., 116-118), where the output is configured to depict, to a user of the computer-implemented text classifier (e.g., 108), information that is indicative of operation of the computer-implemented text classifier (e.g., 108) with respect to assignation of the input vector to the class by the computer-implemented text classifier (e.g., 108).

(B2) In some embodiments of the method of B1, generating the output includes for a vector in the set of vectors, computing a similarity score that is indicative of similarity between the vector and the input vector. Generating the output further includes based upon the similarity score, retrieving a second sequence of terms, wherein the vector is representative of the second sequence of terms, and further wherein the second sequence of terms is included in the output.

(B3) In some embodiments of the method of B2, generating the output further includes computing a respective similarity score for each vector in the set of vectors, where the second sequence of terms is included in the output due to the similarity score being highest from amongst similarity scores computed for vectors in the set of vectors.

(B4) In some embodiments of any of the methods of B1-B3, generating the output includes accessing weights that are assigned to the selected class profile, wherein the weights respectively correspond to terms represented in the set of vectors. Generating the output further includes determining that the sequence of terms includes a terms that has a weight corresponding thereto. Generating the output also includes determining that the weight is above a predefined threshold, wherein the output includes the word highlighted to indicate to the user that the computer-implemented text classifier assigned the class to the input vector due to the term being included in the sequence of terms.

(B5) In some embodiments of the method of B4, the output further includes the weight.

(B6) In some embodiments of any of the methods of B1-B5, the centroidal classifier comprises class profiles that respectively map to the several classes to which input vectors are assignable by the computer-implemented text classifier.

(B7) In some embodiments of the method of B6, the method also includes learning the class profiles such that values of affiliation ratios between the class profiles and the respective several classes are collectively optimized.

(B8) In some embodiments of any of the methods of B1-B7, the computer-implemented text classifier comprises at least one of a recurrent neural network (RNN) or a convolutional neural network (CNN).

(B9) In some embodiments of any of the methods of B1-B8, each vector in the set of vectors comprises several sub-vectors of values that are respectively representative of terms, and further wherein the class profile is constructed based upon averages of the several sub-vectors of values.

(B10) In some embodiments of any of the methods of B1-B9, the output further comprises a value for an affiliation score computed for the class profile, where the value for the affiliation score is indicative of correspondence between assignments of vectors to the class by the computer-implemented text classifier and the centroidal classifier.

(C1) In another aspect, some embodiments include a computing system (e.g., 100) that includes a processor (e.g., 102) and memory (e.g., 104), where the memory includes instructions that, when executed by the processor, cause the processor to perform any of the methods described herein (e.g., any of A1-A7 and/or B1-B10).

(D1) In yet another aspect, some embodiments include a computer-readable storage medium includes instructions that, when executed by a processor (e.g., 102) of a computing system (e.g., 100), cause the processor to perform any of the methods described herein (e.g., any of A1-A7 and/or B1-B10).

The term "or", as used herein, is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
obtaining an identity of a class assigned to an input vector by a computer-implemented text classifier, wherein the input vector is representative of a sequence of terms, and further wherein the class is amongst several classes to which input vectors are assignable by the computer-implemented text classifier;
based upon the identity of the class, selecting a class profile of a centroidal classifier, the class profile previously constructed based upon a set of vectors previously identified as belonging to the class by the computer-implemented text classifier; and
generating output based upon the selected class profile, wherein the output comprises text extracted from the class profile, where the text extracted from the class profile is configured to be informative, to a user of the computer-implemented text classifier as to why the computer-implemented text classifier assigned the input vector to the class.

2. The computing system of claim 1, wherein generating the output comprises:
for a vector in the set of vectors, computing a similarity score that is indicative of similarity between the vector and the input vector; and
based upon the similarity score, retrieving a second sequence of terms, wherein the vector is representative of the second sequence of terms, and further wherein the second sequence of terms is included in the output.

3. The computing system of claim 2, wherein generating the output further comprises:
computing a respective similarity score for each vector in the set of vectors, where the second sequence of terms is included in the output due to the similarity score being highest from amongst similarity scores computed for vectors in the set of vectors.

4. The computing system of claim 1, wherein generating the output comprises:
accessing weights that are assigned to the selected class profile, wherein the weights respectively correspond to terms represented in the set of vectors;
determining that the sequence of terms includes a term that has a weight corresponding thereto; and
determining that the weight is above a predefined threshold, wherein the output includes the word highlighted to indicate to the user that the computer-implemented text classifier assigned the class to the input vector due to the term being included in the sequence of terms.

5. The computing system of claim 4, wherein the output further includes the weight.

6. The computing system of claim 1, wherein the centroidal classifier comprises class profiles that respectively map to the several classes to which input vectors are assignable by the computer-implemented text classifier.

7. The computing system of claim 6, the acts further comprising:
learning the class profiles such that values of affiliation ratios between the class profiles and the respective several classes are collectively optimized.

8. The computing system of claim 1, wherein the computer-implemented text classifier comprises at least one of a recurrent neural network (RNN) or a convolutional neural network (CNN).

9. The computing system 1, wherein each vector in the set of vectors comprises several sub-vectors of values that are respectively representative of terms, and further wherein the class profile is constructed based upon averages of the several sub-vectors of values.

10. The computing system of claim 1, wherein the output further comprises a value for an affiliation score computed for the class profile, wherein the value for the affiliation score is indicative of correspondence between assignments of vectors to the class by the computer-implemented text classifier and the centroidal classifier.

11. A computer-readable storage medium comprising instructions that, when executed by a processor, cause the processor to perform acts comprising:
obtaining an identity of a class previously assigned to an input vector by a computer-implemented text classifier, wherein the input vector is representative of a sequence of terms, and further wherein the class is amongst several classes to which input vectors are assignable by the computer-implemented text classifier;
based upon the identity of the class, selecting a class profile of a centroidal classifier, the class profile constructed based upon a set of vectors previously identified as belonging to the class by the computer-implemented text classifier; and
generating output based upon the selected class profile, wherein the output is configured to be information to a user of the computer-implemented text classifier as to why the computer-implemented text classifier assigned the input vector to the class.

12. The computer-readable storage medium of claim 11, the acts further comprising:
for a vector in the set of vectors, computing a similarity score that is indicative of similarity between the vector and the input vector; and
based upon the similarity score, retrieving a second sequence of terms, wherein the vector is representative of the second sequence of terms, and further wherein the second sequence of terms is included in the output.

13. The computer-readable storage medium of claim 12, wherein generating the output further comprises:
computing a respective similarity score for each vector in the set of vectors, where the second sequence of terms is included in the output due to the similarity score being highest from amongst similarity scores computed for vectors in the set of vectors.

* * * * *